May 3, 1966 W. BLACKFORD 3,249,826

SEMICONDUCTOR DEVICE MOUNTING HAVING ONE PORTION OF THE SEMICONDUCTOR SECURED TO A LEAD

Filed April 5, 1961

INVENTOR:
WILLIAM BLACKFORD,

BY Julius J. Zaskalicky
HIS ATTORNEY.

United States Patent Office 3,249,826

Patented May 3, 1966

3,249,826

SEMICONDUCTOR DEVICE MOUNTING HAVING ONE PORTION OF THE SEMICONDUCTOR SECURED TO A LEAD

William Blackford, Fayetteville, N.Y., assignor to General Electric Company, a corporation of New York Filed Apr. 5, 1961, Ser. No. 100,916
3 Claims. (Cl. 317—234)

The present invention relates generally to semiconductor devices and, more particularly, to mounting structures for the active elements of such devices. The present invention is an improvement in the invention set forth in a copending patent application Serial Number 100,933 of Smith and Sylvan, filed April 5, 1961, and assigned to the assignee of the present invention.

An object of the present invention is to provide improved mounting structures for semiconductor devices which are able to withstand considerable mechanical stress and shock.

It is another object of the present invention to provide mounting structures for semiconductor devices which are simpler, less costly, and at the same time permit easy fabrication of the devices therefrom than prior art devices.

The features of this invention which are believed to be novel are set forth with particularity in the appended claims. The invention itself, however, both as to its organization and method of operation, together with further objects and advantages thereof, may best be understood by reference to the following description taken in accordance with the accompanying drawings in which:

Figure 1:
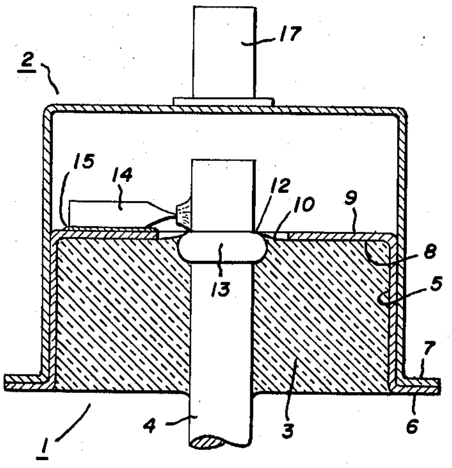
FIGURE 1 is a sectional view of a semiconductor device showing the mounting structure in accordance with the present invention.

Referring now to FIGURE 1, there is shown a device comprising a header member 1 and a cap member 2. The header member comprises an insulating base portion 3 which may be glass in which is embedded a conductive lead 4 and which is surrounded by a conductive cylindrical member 5 having a flange portion 6 adapted to engage with the flange portion 7 of the cap 2 to form a hermetic seal. The cylindrical member 5 also has another conductive portion 8 extending over the top surface of the insulating member and providing a conductive surface preferably having a surface elevated above the top surface 10 of the insulating member 3. Preferably the conductive cylinder 5 is of fernico composition bonded to the glass and having a coefficient of expansion comparable to the coefficient of expansion of the glass. The conductive lead may also be made of a fernico bonded to the glass and making a hermetic seal between the glass and conductive member. A fernico containing by weight 54 percent iron, 29 percent nickel and 17 percent cobalt would be suitable. It is, of course, understood that other such materials containing iron, nickel and cobalt commonly used in the art and known under such trade names as Kovar would also be suitable. The lead 4 is embossed or coined to form a bead 13 thereon with a shoulder 12 in the vicinity of the planar surface 9. The embossed or coined portion permits easy confinement of the glass below the shoulder portion of the bead in the process of fabrication of the header. Recessing the glass below the plane of the top surface 9 facilitates fabrication of semiconductor devices thereon, as will be apparent from a consideration of the fabrication of devices utilizing the mounting structures shown.

Figure 2:
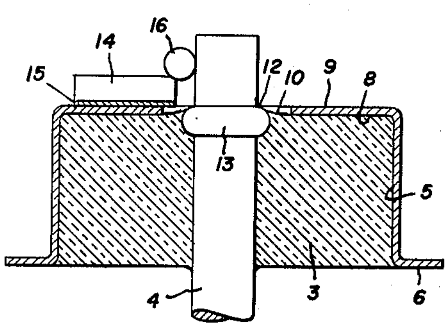
FIGURE 2 is a sectional view of a part of the device of FIGURE 1 showing the mounting structure in one of the assembly steps thereof.

The manner of fabrication of the device of FIGURE 1 will be illustrated in connection with the fabrication of a tunnel diode device. A bar 14 of semiconductor material of N-type conductivity of appropriate resistivity is placed on the conductive surface 9, as shown in FIGURE 2. A solder preform 15 consisting of a small piece of foil, for example, gold doped or activated with antimony (99 percent gold and 1 percent antimony by weight) is placed between the conductive surface and the bar. The bar, solder and surface are heated to cause a fusion of the bar to the surface. Next, a ball 16 of suitable alloying material, for example, gallium-doped indium (98½ percent indium, 1.5 percent gallium by weight) is placed between the end of the bar adjacent the lead and the lead. The bar and ball is then again heated to cause the P-type conductivity inducing material to alloy into the germanium, recrystallize and form a P-type conductivity region therein and at the same time make a connection of the P-type region to the lead, as shown in FIGURE 1. The ball may be lodged between the bar 14 and the lead 4 or may be pressed into the gap formed by these members. Heavy doping of the bar and the alloying material is used so that a tunnel junction is formed. The header is then electrolytically etched in an appropriate electrolyte, such as sodium hydroxide, to reduce the junction to sufficient size to produce the characteristics desired.

As apparent from the foregoing description, recessing the glass from the surface 9 and shoulder 12 facilitates etching of the semiconductor material. The coined portion 13, having a shoulder essentially in alignment with the plane surface 9, permits the ball 16 to be properly held in place while the junction in the semi-conductor bar is formed in situ and, concurrently, contact is made to lead 4. Of course, it will be appreciated that the semiconductor bodies mounted on the mounting structure may as well be done in the other ways disclosed in the aforementioned patent application. The cap 2 having a conductive lead 17 therein is secured by welding to the header to form a hermetic seal. The lead 17 is essentially in axial alignment with the lead 4 on the header 1.

Figure 3:
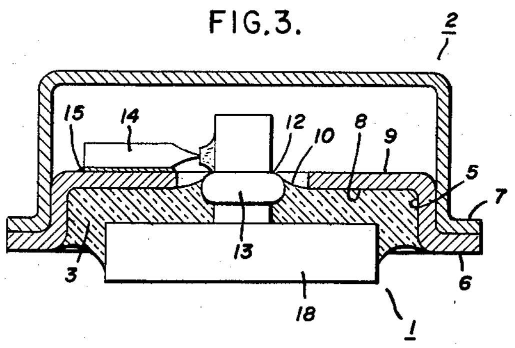
FIGURE 3 is a sectional view of another embodiment of the present invention.

Referring now to FIGURE 3, there is shown a modification of the device of FIGURE 1. Corresponding elements are referred to by corresponding numerals. This device is similar to the device of FIGURE 1. The overall height, however, has been considerably reduced and the thickness of the planar insulating member 3 in relationship to its diameter is appreciably smaller than the insulating member 3 of FIGURE 1. In order to provide good support for the insulating member in such a configuration, a metallic plate member 18 is securely bonded to the insulating member 3 to provide strength, hermetic seal, and at the same time preserve the coaxial symmetry of the structure. The plate member 18 is secured to the lead 4 and provides one terminal for the device of FIGURE 3, the cap 2 which conveniently is of correspondingly reduced height providing the other terminal. The plate member 18 is also preferably made of a fernico material which hermetically bonds to glass and has a coefficient of expansion comparable thereto.

While specific embodiments have been shown and described, it will, of course be understood that various modifications may be devised by those skilled in the art which will embody the principles of the invention and found n the true spirit and scope thereof.

What I claim as new and desire to secure by Letters Patent of the United States is:

1. A semiconductor device mounting comprising a planar insulating member having a conductive lead extending therethrough and having a conductive cylindrical member extending peripherally thereabout, said cylindrical member having an inwardly extending flange forming a planar conductive area on said planar insulating member in spaced relationship to said lead, said planar conductive area being elevated above said insulating member by substantially the thickness of said flange, and said lead having a bead about said lead in the vicinity adjacent said planar conductive area, whereby a body of semiconductor material may have a surface directly secured to said conductive area and another portion secured to said lead above said bead.

2. A semiconductor device comprising a planar insulating member having a lead extending axially therethrough and having a conductive cylindrical member extending peripherally thereabout and over a planar surface of said insulating member in coaxial relationship to said lead, said conductive cylindrical member forming a planar conductive area on said planar surface of said planar insulating member, said planar conductive area being in spaced relationship to said lead and secured to said insulating member, said lead having a bead thereabout in the vicinity of said planar conductive area, a bar of semiconductor material having one portion secured to said conductive area and the other portion thereof secured to said lead on the top shoulder of said bead, said insulating member being recessed from the planar surface defined by said planar conductive area and the shoulder of said bead, a cup-shaped conductive cap member sealed to said cylindrical portion.

3. A semiconductor device comprising a planar insulating member having a lead extending axially therethrough and having a conductive cylindrical member extending peripherially thereabout and over a planar surface of said insulating member in coaxial relationship to said lead, said conductive cylindrical member forming a planar area on said planar surface of said planar insulating member, said planar conductive area being in spaced relationship to said lead and secured to one face of said planar insulating member, said lead having a bead portion thereabout in the vicinity of said planar conductive area, a bar of semiconductor material having one portion secured to said conductive area and the other portion thereof secured to said lead on the top shoulder of said bead, said insulating member being recessed from the planar surface defined by said planar conductive area and the shoulder of said bead, a cup-shaped conductive cap member sealed to said cylindrical portion, a plate member secured to the other face of said planar insulating member coaxially aligned with said cylindrical member, in insulated relationship therewith and conductively secured to said lead.

References Cited by the Examiner

UNITED STATES PATENTS

| | | | |
|---|---|---|---|
| 2,751,527 | 6/1956 | Shower | 317—234 |
| 2,963,632 | 12/1960 | Kilian et al. | 317—235 |
| 2,990,501 | 6/1961 | Cornelison et al. | 317—234 |
| 3,021,461 | 2/1962 | Oakes et al. | 317—235 |

JOHN W. HUCKERT, *Primary Examiner.*

DAVID J. GALVIN, *Examiner.*

A. S. KATZ, J. D. CRAIG, *Assistant Examiners.*